May 22, 1934.  H. K. ANSINGH  1,959,608
ELECTRIC MOTOR
Filed April 6, 1933
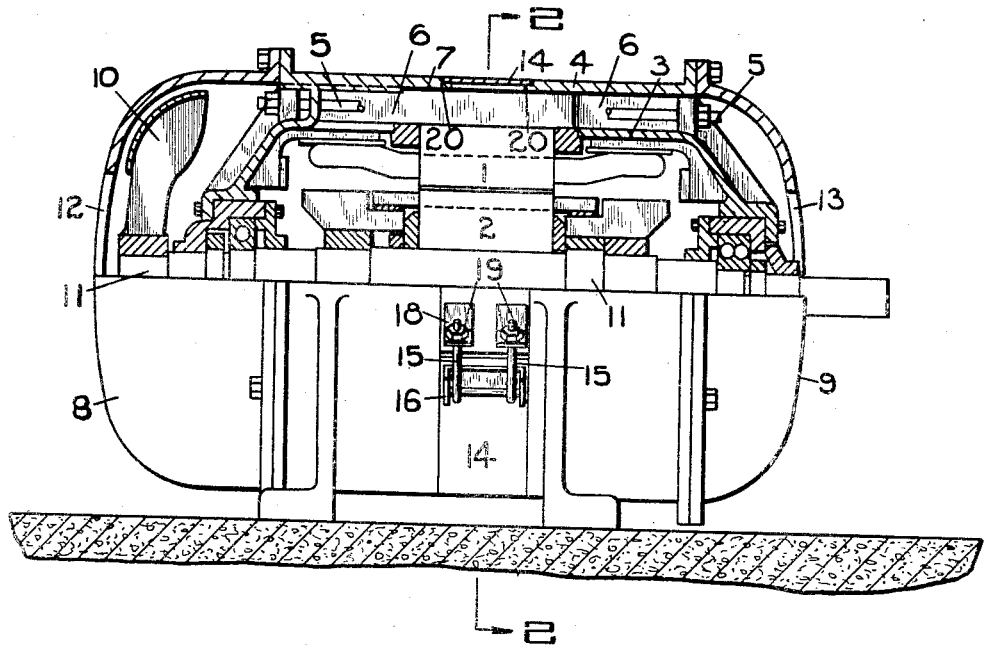
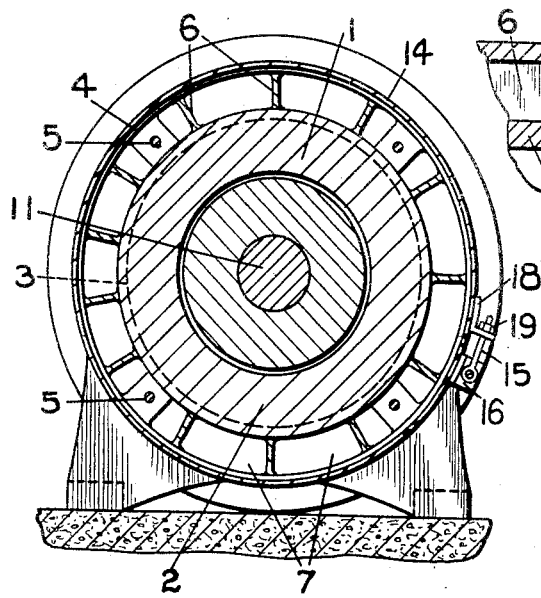
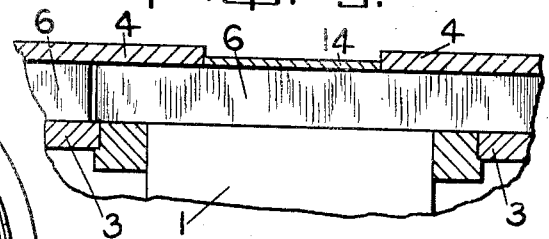
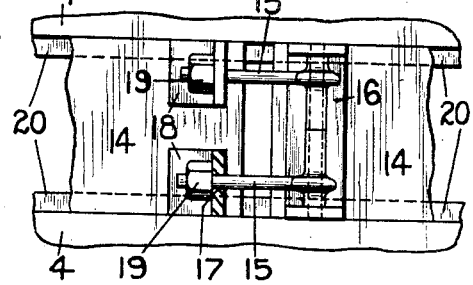
Inventor
H. K. ANSINGH
By
*J. C. M. Featherstonhaugh*
Attorneys Patented May 22, 1934

1,959,608

UNITED STATES PATENT OFFICE 1,959,608

ELECTRIC MOTOR

Herman Kimball Ansingh, St. Catharines, Ontario, Canada, assignor to English Electric Company of Canada, Limited, St. Catharines, Ontario, Canada, a company of Canada Application April 6, 1933, Serial No. 664,791
In Canada March 18, 1933

2 Claims. (Cl. 172—36)

My invention relates to improvements in electric motors particularly of the air cooled enclosed type having air ducts extending through the motor casing through which air from a fan is circulated, and the object of the invention is to provide means for enabling the air ducts or passages to be inspected without the necessity of having to remove the motor from its bed or machine to which it is attached or to remove the motor casing end shields.

A further object is to devise a means for the above purpose which can be readily attached and detached.

With the above and other objects in view which will hereinafter appear as the specification proceeds, my invention consists, in its preferred embodiment, of the construction all as hereinafter more particularly described and illustrated in the accompanying drawing in which:—

Fig. 1 represents a side elevation (partly in section) of a motor constructed according to my invention.

Fig. 2 is a vertical cross section thereof taken through the line 2—2 (Fig. 1).

Fig. 3 is an enlarged fragmentary plan view of my securing means for the inspection strip, and Fig. 4 is an enlarged fragmentary longitudinal section through a motor showing a slightly modified form of inspection strip.

Like characters of reference indicate corresponding parts in the different views.

In order to explain the purpose and application of my air duct inspecton means, I will describe generally the type of electric motor to which the device is applicable. In such type of motor, the stator 1 and the rotor 2 are enclosed in a casing of cylindrical form which comprises the concentrically disposed inner and outer spaced apart walls 3 and 4 respectively. The casing is divided transversely into two portions held together by the longitudinal bolts 5, and longitudinal radial spaced apart webs 6 extend between the inner walls 3 and the outer walls 4. These webs divide the casing interior into a plurality of longitudinal air ducts or passages 7 open at their ends, the opposed ends of the casing being provided with end shields 8 and 9, the shield 8 extending about a fan 10 secured to the rotor shaft 11 and having an air inlet orifice 12 therein, and the shield 9 having an air outlet orifice 13.

The outside air drawn into the casing by the fan 10 is circulated through the ducts 7 and out of the outlet 13 thus cooling the motor en route.

In the orthodox construction of motors of this type the adjacent ends of the casing walls abut each other, but in my case I so construct the casing that the adjacent ends of the outer walls are spaced apart and thus expose the ribs 6 and the air ducts or passages 7, consequently constituting a circumferential channel or orifice about the central portion of the motor casing.

To close such orifice I provide a strip or ribbon 14 of comparatively thin material, such as steel, which forms a split ring filling the orifice, and to the ends of such ring I attach an adjustable securing means which may comprise bolts 15 hinged on a bracket 16 secured to one end of the strip or ring 14. The free ends of the bolts 15 extend through orifices 17 in the brackets 18 secured to the other end of the ring 14 and nuts 19 are threaded onto the ends of the bolts. Thus the ends of the ring 14 can be drawn together to dispose the ring in place.

In the form illustrated in Fig 1 the adjacent ends of the outer casing walls 4 have circumferential rebates 20 extending inwardly from their outer peripheries and the ring 14 rests therein but, in the form shown in Fig. 4, no such rebates are provided and the strip 14, while closing the orifice, rests upon the ribs 6.

When the strip 14 is removed by disconnecting the attaching means at its ends, the air ducts can be inspected and cleaned out without the necessity of having to remove the end shields and displace the motor from the machine to which it is connected.

My device can be applied to all motors of this type and is not confined to the particular form illustrated. Furthermore, the adjustable securing means provided can be varied at will.

What I claim as my invention is:

1. In an air cooled electric motor, the combination with an annular casing formed of spaced apart inner and outer concentric walls and longitudinally extending spaced apart radial webs forming the concentric walls and dividing the annular space therebetween into a plurality of longitudinal air ducts, the outer wall having a circumferential aperture therethrough with the webs extending across such aperture, and a removable annular closure for the aperture.

2. In an air cooled electric motor as claimed in claim 1 wherein the casing is divided transversely into two opposed portions with the free ends of the webs of each portion substantially abutting each other and the adjacent circumferential free edges of the outer walls of each portion spaced apart from each other to constitute the aforesaid circumferential aperture adapted to be closed by the removable closure.

HERMAN KIMBALL ANSINGH.